United States Patent
Zhao et al.

(10) Patent No.: US 11,182,464 B2
(45) Date of Patent: Nov. 23, 2021

(54) MOBILE KEY VIA MOBILE DEVICE AUDIO CHANNEL

(71) Applicant: VMware, Inc., Palo Alto, CA (US)

(72) Inventors: Sam Zhao, Beijing (CN); Shengbo Teng, Beijing (CN); Nan Wang, Beijing (CN); Bomin Nie, Beijing (CN)

(73) Assignee: VMware, Inc., Palo Alto, CA (US)

( * ) Notice: Subject to any disclaimer, the term of this patent is extended or adjusted under 35 U.S.C. 154(b) by 395 days.

(21) Appl. No.: 16/035,531

(22) Filed: Jul. 13, 2018

(65) Prior Publication Data

US 2020/0019693 A1 Jan. 16, 2020

(51) Int. Cl.
| | |
|---|---|
| *H04L 29/06* | (2006.01) |
| *G06F 21/35* | (2013.01) |
| *H04L 9/32* | (2006.01) |
| *G06F 21/43* | (2013.01) |
| *H04L 9/08* | (2006.01) |

(52) U.S. Cl.
CPC .............. *G06F 21/35* (2013.01); *G06F 21/43* (2013.01); *H04L 9/088* (2013.01); *H04L 9/3247* (2013.01); *H04L 63/0884* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 9,299,386 | B2 * | 3/2016 | Shah | G10L 19/018 |
| 10,594,689 | B1 * | 3/2020 | Weaver | H04L 9/3247 |
| 2006/0171539 | A1 * | 8/2006 | Winningstad | H04N 7/183 380/270 |
| 2007/0011466 | A1 * | 1/2007 | Imura | G07C 9/37 713/186 |
| 2010/0064341 | A1 * | 3/2010 | Aldera | H04W 8/245 726/1 |
| 2010/0227549 | A1 * | 9/2010 | Kozlay | H04L 9/0662 455/26.1 |

(Continued)

OTHER PUBLICATIONS

Petrovic, Rade. Digital Watermarks for Audio Integrity Verification. TELSIKS 2005-2005 uth International Conference on Telecommunication in Modern Satellite, Cable and Broadcasting Services. https://ieeexplore.IEEE.org/stamp/stamp.jsp?tp=& arnumber=1572095 (Year: 2005).*

(Continued)

*Primary Examiner* — Jeremiah L Avery (57) ABSTRACT

A system and method are described for performing authentication on a computing device using a mobile device connected over an audio channel to the computing device, in scenarios where smart card authentication may have been traditionally used. An application executing on the computing device receives a request from a user, which request requires authentication of the user before being allowed by the application. An audio transmission containing encoded data including information authenticating the user is received at the computing device from the user's mobile device via a microphone. The audio transmission is decoded and the information authenticating the user is extracted. The information authenticating the user is verified and the request is allowed in the application.

20 Claims, 5 Drawing Sheets

(56) References Cited

U.S. PATENT DOCUMENTS

| | | | | |
|---|---|---|---|---|
| 2011/0119490 | A1* | 5/2011 | Kaal | H04L 63/029 |
| | | | | 713/169 |
| 2012/0128154 | A1* | 5/2012 | Ran | H04K 1/00 |
| | | | | 380/255 |
| 2013/0308778 | A1* | 11/2013 | Fosmark | H04L 63/0823 |
| | | | | 380/270 |
| 2014/0093083 | A1* | 4/2014 | Dadu | G06F 21/62 |
| | | | | 380/275 |
| 2014/0172422 | A1* | 6/2014 | Hefetz | G10L 19/0208 |
| | | | | 704/229 |
| 2017/0201561 | A1* | 7/2017 | Hongell | H04W 4/80 |
| 2019/0013027 | A1* | 1/2019 | Page | G06F 21/32 |

OTHER PUBLICATIONS

Zhu, Xiaoyan et al. QuickAuth: Two-Factor Quick Authentication Based on Ambient Sound. 2016 IEEE Global Communications Conference (GLOBECOM). https://ieeexplore.ieee.org/stamp/stamp.jsp?tp=&arnumber=7842192 (Year: 2016).*

Wang, Mingyue et al. SoundAuth: Secure Zero-Effort Two-Factor Authentication Based on Audio Signals. 2018 IEEE Conference on Communications and Network Security (CNS). https://ieeexplore.ieee.org/stamp/stamp.jsp?tp=&arnumber=8433202 (Year: 2018 ).*

Arun Kumar; "Data over Sound—Alternative Data Transfer Methods"; https://www.thewindowsclub.com/data-sound-alternative-data-transfer-methods; Aug. 17, 2015; retrieved on Jul. 2, 2018.

"Global Market Study on Smart Card: Contactless Card Segment Anticipated to Gain Significant Market Share over the Forecast Period 2017-2024"; http://www.persistencemarketresearch.com/market-research/smart-cards-market.asp; retrieved on Jul. 2, 2018.

"Smart Cards Market Analysis By Type (Contact Cards, Contactless Cards, Multi-Component Cards), by Component (Memory-Based, Microcontroller-Based), by Application, by Region, and Segment Forecasts, 2018-2025"; http://www.grandviewresearch.com/industry-analysis/smart-card-industry; retrieved on Jul. 2, 2018.

"PC/SC"; https://en.wikipedia.org/wiki/PC/SC; retrieved on Jul. 2, 2018.

"PKGS 11"; https://en.wikipedia.org/wiki/PKCS_11; retrieved on Jul. 6, 2018.

"Smart Cards"; https://technet.microsoft.com/en-us/library/dd277362.aspx; retrieved on Jul. 6, 2018.

"Smart Card Architecture"; https://technet.microsoft.com/en-us/library/dn579267(v=ws.11 ).aspx; Aug. 31, 2016; retrieved on Jul. 6, 2018.

"The Smart Card Cryptographic Service Provider Cookbook"; https://msdn.microsoft.com/en-us/library/ms953432.aspx; May 2014; retrieved on Jul. 6, 2018.

"Kerberos (protocol)"; https://en.wikipedia.org/wiki/Kerberos_(protocol); retrieved on Jul. 6, 2018.

\* cited by examiner

MOBILE KEY VIA MOBILE DEVICE AUDIO CHANNEL

TECHNICAL FIELD

The present disclosure generally relates to user authentication on computing devices, and more specifically to authenticating a user on a computing device using a mobile device via the audio channel.

BACKGROUND

In today's world, mobile computing devices such as smartphones are become increasingly more and more versatile and ubiquitous with every coming day. Not only are the features and capabilities of mobile devices improving and growing in number and variety, but the modern mobile computing device is also rapidly replacing various traditional devices for performing their functions. With superior computing capacity, convenient form factors, network connectivity, advanced interfacing ability with high quality displays, and various other advantages, the smart phone has proven to be a more convenient and often more effective way to perform the tasks of traditional devices. Photo and video cameras, navigation devices, watches, answering machines, scanners, alarm clocks, portable gaming consoles, etc. are just some of the devices that mobile devices such as smartphones have replaced to a significant extent, and the list goes on. However, in some areas the mobile computing device has had a smaller impact in replacing traditional technology. One such area is in security devices, such as smart cards.

A smart card or Integrated Circuit Card (ICC) is a card generally made of plastic that contains an integrated circuit that is compatible with ISO 7816. It is a small, tamperproof computer. Smart cards are used with a smart card reader to provide services such as personal identification, authentication, data storage, and application processing. The smart card itself contains a central processing unit (CPU) and some non-volatile storage. In most cards, some of the storage is tamperproof while the rest is accessible to any application that can talk to the card. This capability makes it possible for the card to keep some secrets, such as the private keys associated with any certificates it holds. The card itself performs its own cryptographic operations. Smart cards are a key component of the public key infrastructure (PKI) that Microsoft Corporation is integrating into its Windows platform because smart cards enhance software-only solutions, such as client authentication, logon, and secure email.

The increasing trend of organizations to move toward digitalization of payment processes and efficient storage of personal data is fueling the growth of the smart card industry. The growing adoption of Internet-of-Things (IoT) and advancements in micro-embedded electronics are anticipated to further promote this industry growth.

However, the traditional smart card enrollment process and corresponding management is cumbersome and error prone, requiring significant manual effort from information technology (IT) administrators. The systems require providing and maintaining hardware components such as smart card readers. In addition, users are burdened with the task of having to carry and handle one or multiple smart cards. At the same time, almost every person today already carries a mobile computing device, such as a smart phone, which has ample computing and storage capacity for perform many of the smart card's functions.

A more efficient approach is desirable for performing the functions of security devices such as smart cards.

DETAILED DESCRIPTION

Systems and methods in accordance with various embodiments of the present disclosure overcome at least some of the above-mentioned shortcomings and deficiencies by providing efficient ways to use mobile devices such as smartphones for performing authentication functions traditionally performed using smart cards. In particular, embodiments described herein provide a system where a mobile computing device stores security information such as the security information typically stored on smart cards, which is used by the mobile device to perform authentication operations with a client device over an audio channel established between the mobile device and the client device. As a result, a secure method of authentication is achieved without the inconvenience and hardware requirements present in smart card-based systems.

The process begins by a request being made on the client device requiring authentication before the request is allowed. For example, a user who wishes to use the client or an application on the client may request access to the client or the application, and the client can require authentication before the requested access is permitted. The request may be initiated by the user making a selection via the client's graphical user interface (GUI). A typical scenario would be where the user wishes to authenticate herself when signing-on to use a workstation computer in an enterprise environment. In other scenarios, authentication may be required before requests to access protected data, peripheral devices, network resources, or any other types of resources are permitted.

Conventionally, the user would have performed such authentication by inserting a smart card into a card reader connected to the client. The client would then communicate with the smart card via the card reader and convey authentication messages requesting verification information to the smart card. The smart card would receive the authentication messages and send response messages signed using a secret key stored in a protected place on the card (e.g., a private key in the PKI framework) back to the client via the card reader.

The signed messages would then be verified by the client and authentication would be allowed if verification is successful.

In various embodiments, instead of implementing the smart card and the smart card reader, the systems and methods described herein perform this authentication routine over an audio channel between the client (e.g., workstation) and a mobile device (e.g., smartphone) on which the security information that is typically stored on the smart card, such as a secret key, is stored, by interchanging authentication messages and signed response messages between the client and mobile devices over the audio channel. Communication over the audio channel can be performed according to any protocol for transmitting data over sound. In such data-over-sound transmission, an audio stream with encoded data is sent via the speakers of the sending device and received via the microphone of the receiving device. The received audio stream is then decoded by the receiving device to extract the data from the audio transmission. Hence, communication over the audio channel between the client device and the mobile device takes place by sending messages from the speakers of the client device to the microphone of the mobile device, and sending messages from the speakers of the mobile device to the microphone of the client device.

After an input or request is produced on the client (e.g., the workstation) that requires authentication (e.g., the user provides GUI input to log-on to a workstation, to access an application, to access a function of an application, etc.), the client broadcasts authentication messages for verifying the user via the audio channel, i.e., by sending an audio signal containing encoded data through a speaker on the client. The user then brings the user's mobile device, on which the user's security information including a secret key is stored, in proximity of the client so that the mobile device can detect the audio transmission through its microphone. The mobile device picks up the audio transmission and a mobile sound verification application on the mobile device interprets and reads the authentication message. The mobile sound verification application then generates a signed response message in reply to the authentication message using the secret key and conveys the response message to the client over the audio channel. That is, the response message is sent via a speaker on the mobile device and received by a microphone on the client. On the client, the received audio transmission containing the signed response message is decoded and read by a client sound verification application. Authentication is permitted after the signed response message is successfully verified at the client.

In this fashion, a secure method of authentication is achieved without the inconvenience and hardware requirements present in smart card-based systems. A user simply needs to have a mobile computing device with the mobile sound verification application installed and store any necessary security information such as keys and certificates on the device. Additionally, the mobile device can function as several smart cards since it can hold multiple user profiles, keys, certificates, etc.

Leveraging the audio channel for transferring data between the client and the mobile device has numerous advantages over other communication protocols, such as Wi-Fi, Bluetooth, and Near-Field Communication (NFC). For example, Wi-Fi requires that both the mobile device and the client stay on the same Wi-Fi hot spot, and an additional Wi-Fi device may be needed. Bluetooth requires that both the mobile device and the client are paired before they can communicate. NFC is not normally equipped on many devices, such as workstation systems. On the other hand, most devices that would serve as clients, such workstation systems, have a microphone and a speaker. Likewise, all smart mobile devices generally have a microphone and a speaker. And, there is no need to acquaint or configure two devices to communicate over the audio channel, the two devices merely have to be within a certain distance of each other and each needs to have a microphone and a speaker.

Figure 1:
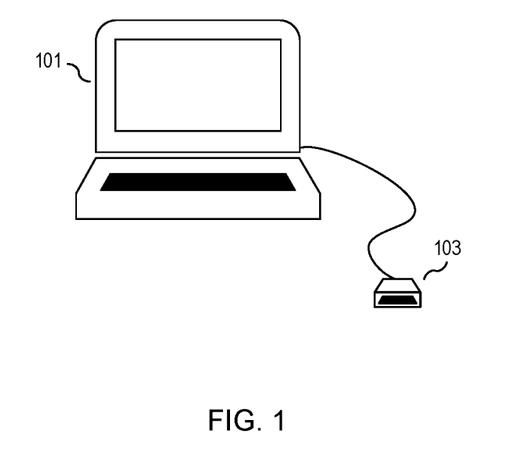
FIG. 1 illustrates an example of a client device implementing a traditional smart card reader for authentication.

FIG. 1 illustrates an example of a client device implementing a traditional smart card reader for authentication. As illustrated in the example of FIG. 1, a client device 101 is connected to a smart card reader 103 via a wire. The client 101 can be any type of computing device, such as a desktop computer, a workstation, a terminal, etc., which contains an application that requires some type of authentication performed via a smart card. As used herein, the terms "client", "client device", and "computing device" may be interchangeable and may have the same meaning, as applicable. For example, the client 101 can contain an application that requires a user to authenticate him or herself (e.g., to prove the user's identity) using a smart card before the user can use the application, or a user may need to authenticate him or herself before the user is allowed to use the client at all. Smart cards can also be used for data storage, and in other applications involving identity verification of some kind. Smart card-based systems can be implemented via different types of hardware as well. For example, a smart card reader can be implemented via a USB port on the client and the smart card itself can be a USB flash drive that is inserted into the USB port.

In this traditional scenario, the user may perform authentication by inserting a smart card into the card reader 103. In some cases, the card reader 103 may be contactless, only requiring the user to hold the smart card in close proximity of the card reader 103, without inserting it. The client 101 would then communicate with the smart card via the card reader 103 and convey authentication messages to the smart card for verifying the proper identity of the user. The smart card would receive the authentication messages and send response messages signed using a secret key stored in a protected place on the card (e.g., a private key in the PKI framework) back to the client 101 via the card reader 103. The signed messages would then be verified by the client 101 and authentication would be allowed if verification is successful.

Figure 2:
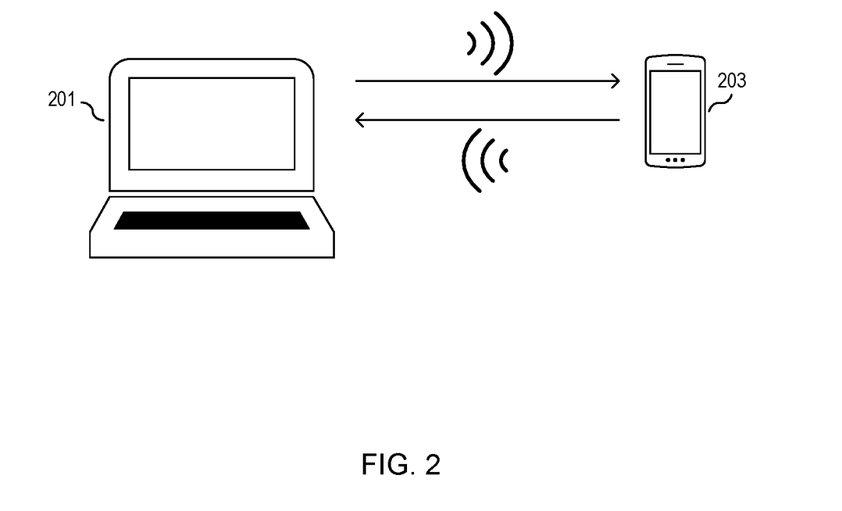
FIG. 2 illustrates an example of a client device in communication with a mobile device over an audio channel for performing authentication functions, in accordance with various embodiments.

FIG. 2 illustrates an example of a client device in communication with a mobile device over an audio channel for performing authentication functions, in accordance with various embodiments. As illustrated in the example of FIG. 2, the client device 201 communicates with a mobile device 203 over an audio channel, the mobile device 203 taking the place of a smart card reader and a smart card. As described above, the communication over the audio channel can be implemented using a data over sound protocol. For example, two-way communication over the audio channel can be implemented using an open source library such as the Quiet Modem Project. The mobile device can be any kind of suitable computing device that can be carried by a person, such as a smartphone, tablet, laptop, etc.

The mobile device 203 and the audio connection replaces the smart card and the smart card reader 103 for performing authentication functions as described in FIG. 1 above. Hence, the client device 201 similarly contains an application requiring authentication for access, except authentication can now be performed using the mobile device 203 over the audio connection instead of the smart card reader 103. To accomplish this, the mobile device 203 stores the necessary security information typically stored on a smart card (e.g., 103) for performing secure authentication, such as the secret key (e.g., private key in the PKI framework), user certificate, etc. Data such as authentication requests and messages can be sent from the client 201 to the mobile device 203 over the audio channel, as indicated by the arrow from the client 201 to the mobile device 203. Data such as response messages signed using a secret key stored on the mobile device 203 can be sent to the client 201 from the mobile device 203 over the audio channel, as indicated by the arrow to the client 201 from the mobile device 203. Operations typically performed by a smart card, such as producing signed response messages and performing any necessary encryption/decryption operations are performed on the mobile device 203.

The process begins by a request being made on an application running on the client 201, the request requiring authentication before it can be permitted by the application. For example, the request can be made by a user wishing to log into the client 201 or an application on the client 201 to use the client or application. After the request is received by the application, the client 201 broadcasts an authentication message via the client's 201 speaker to verify the identity of the user. The client 201 also begins to listen for a response message to the authentication message via a microphone on the client 201. The authentication message can be generated by the application being accessed or by a separate application (e.g., a client sound verifying application, "client SVA") that performs user authentication over the audio channel and works in conjunction with the application being accessed. A mobile sound verification application ("mobile SVA") for performing authentication over the audio channel executes on the mobile device 203 (e.g., the user can launch the SVA when prompted by the client to perform authentication). The user can also be required (e.g., prompted by the client 201) to bring the mobile device 203 within close proximity of the client 201 to be within range of the audio channel.

When the mobile SVA is executing, it listens for messages coming into the microphone of the mobile device 203. When the client 201 broadcasts the authentication message for verifying the user, the mobile SVA on the mobile device 203 receives and reads the message. In response to the authentication message, the mobile device 203 (e.g., via the mobile SVA) then broadcasts a message via the mobile device speaker(s) containing information authenticating the user. The message is received at the microphone of the client 201 and the authentication information is verified. If verification is successful, then the request is allowed.

In various embodiments, the information authenticating the user received by the client 201 from the mobile device 203 comprises a unique signature computed on the mobile device that verifies the user. For example, the signature can be computed on the mobile device 203 by encrypting data contained in the authentication message using a secret key only available to the user or the mobile device 203. This can be performed based on a secret key-based system, such as the PKI. In this case, the mobile device 203 contains the secret key (or the private key in the PKI) and it uses the secret key to encrypt data that was sent from the client 201 for verifying the mobile device 203. Consequently, a response message containing the signature is broadcast by the mobile device 203 and is picked up at the microphone of the client 201. The signature is verified by the client 201 (or by the client SVA) by decrypting the signature and verifying the decrypted contents of the signature. For example, in the PKI, a publicly available public key corresponding to the private key can be obtained and used to decrypt the response message from the mobile device 203. If the response message is successfully verified after being decrypted, then authentication is successful and the request can be permitted.

To avoid interference, different audio frequencies can be used for sending data from the mobile device 203 to the client 201 than from the client 201 to the mobile device 203. For example, data from the mobile device 203 to the client 201 can be sent with a frequency of 21,000 Hz, and data from the client 201 to the mobile device 203 can be sent with a frequency of 22,000 Hz. Further, frequencies can be selected outside of the audible range so that the data transfer is less disruptive to users and for security and management purposes. Additionally, the data transfer over the audio channel can be adjusted to be only effective within a certain maximum distance, such as 10 to 20 cm between client 201 and mobile device 203, to avoid audio interference among multiple clients. For example, the intensity of the signal can be adjusted so that the data transfer is only effective within a certain distance. The below table illustrates an example of data bandwidth for data transfer over audio between the mobile device 203 and the client 201:

| Channel | Direction | Frequency | Frame Length | Checksum | Bandwidth |
|---------|-----------|-----------|--------------|----------|-----------|
| 1 | Mobile device to Client | 21,000 Hz | 100 B | crc32 | 200 BPS |
| 2 | Client to Mobile Device | 22,000 Hz | 75 B | crc32 | 600 BPS |

In some embodiments, the software application for performing authentication running on the client 201 in FIG. 2 can use a legacy smart card interface according to a standard specification (e.g., Public-Key Cryptography Standards PKCS #11 or Microsoft CryptoAPI) to perform authentication with the mobile device. In this case, the end user's mobile device 203 is regarded by the system as a smart card via interface re-direction. An example of such an implementation is provided in FIG. 3A, below. In some embodiments, the system does not implement standard smart card interfaces on the client-side authentication software. An example of such an implementation is provided in FIG. 3B, below.

Figure 3A:
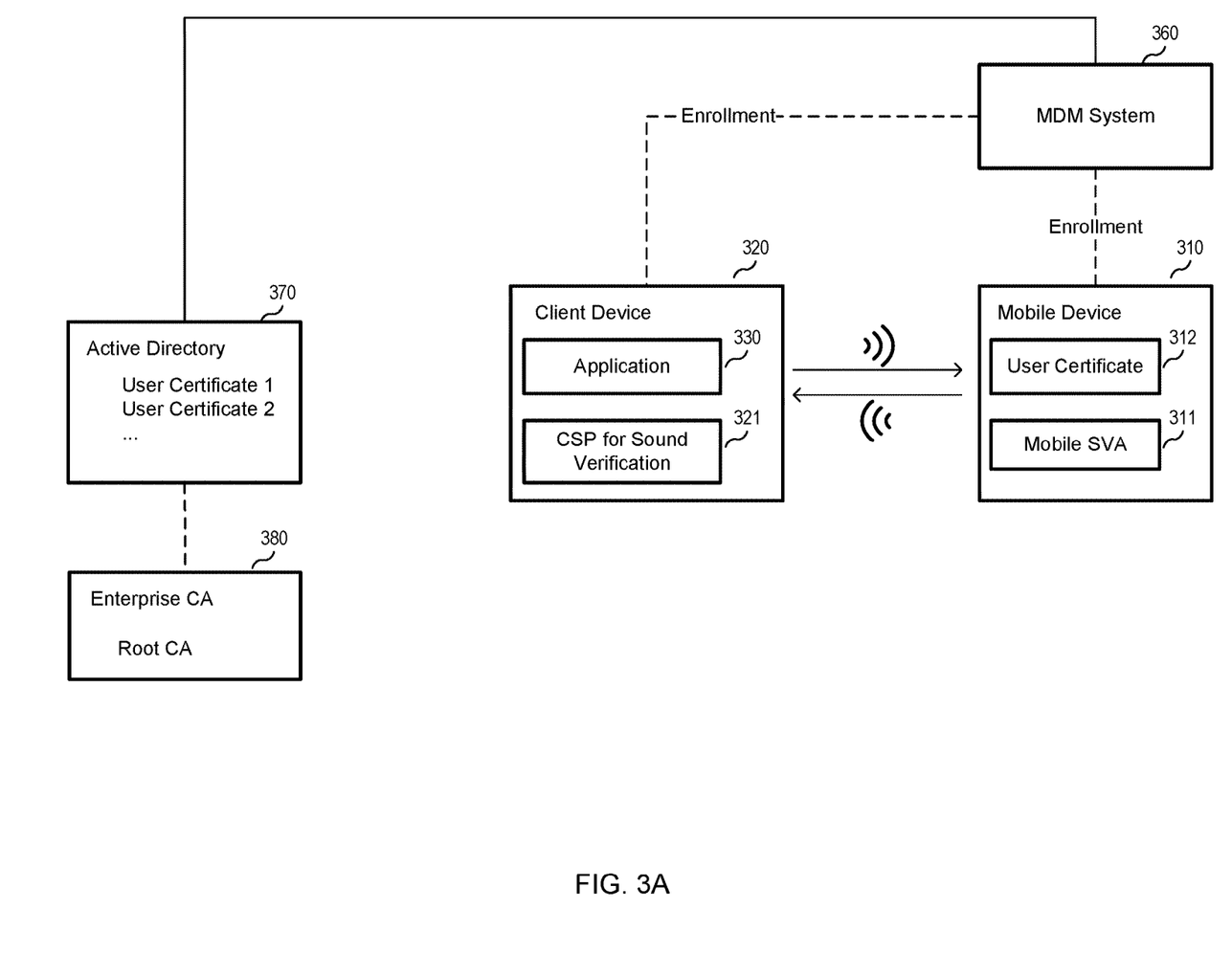
FIG. 3A illustrates an example architecture of a system for user authentication in an enterprise using mobile device over audio channel authentication implementing smart card interface redirection, in accordance with various embodiments.

FIG. 3A illustrates an example architecture of a system for user authentication in an enterprise using mobile device over audio channel authentication implementing smart card interface redirection, in accordance with various embodiments. The system illustrated in the example of FIG. 3A can be deployed in an enterprise to allow users (e.g., employees) to perform authentication operations, such as to verify the users' identities, using the users' mobile devices in implementations where the users might have traditionally used smart cards. As illustrated in the example of FIG. 3, a user's mobile device 310 contains a user certificate 312 and a mobile sound verify application ("Mobile SVA") 311. The mobile device 310 may be managed in the enterprise via a mobile device management ("MDM") system 360 that allows IT administrators to control, secure, and enforce policies on mobile devices in the enterprise such as smartphones, tablets, etc. Generally, the end user can enroll his or her mobile device 310 into the MDM system 360. Subsequently, a security profile is automatically pushed into the end user's mobile device 310, which contains the user's certificate 312. Such MDM systems may also include mobile application management, identity and access management, and enterprise file sync and share. An example of an MDM system is the AirWatch platform available from VMware, Inc. The MDM system 360 generally contains a software solution that is implemented with a server to provide service to devices (not pictured).

The certificate 312 contains various information that is used to authenticate the user, such as the user's name and associated keys (e.g., private key, public key). The certificate 312 can follow the PKI infrastructure, and the certificate 312 can contain the same information as certificates contained on smart cards. In various embodiments, the user certificate 312 is provided to the mobile device 310 by the MDM system 360 from an active directory 370 that stores various information for users in the enterprise including the users' certificates (e.g., 312). MDM solutions like VMware AirWatch can have a complete user certificate management solution for mobile devices in the enterprise environment. When a user's mobile device is enrolled in and managed by the MDM system 360, the user's security profile including the certificate 312 is pushed to the user's mobile device 310.

The mobile SVA 311 is a mobile application that runs on the user's mobile device's 310 operating system (e.g., Android or iOS). The mobile SVA 311 provides access to the user certificate 312 on the mobile device 310, and is also responsible for audio channel setup, reading and writing data transmitted over the audio channel, and corresponding with authentication applications on the client 320 (e.g., smart card API (Cryptographic System Program Interface) remote procedure call (RPC) implementation). The end user can install the SVA 311 from an enterprise application store, or an IT administrator can push the SVA 311 to the end user's mobile device 310 in batch.

A cryptographic service provider ("CSP") for sound verification application 321 executes on the client 320 for providing smart card authentication functions. An IT administrator can push the CSP application 321 to the client 320, or the end user can install the CSP application 321 him- or her-self. The client device 320 can also be enrolled in the MDM system 360 to be managed.

The CSP for sound verification 321 provides a smart card interface according to standard specifications, such as PKCS #11 or Microsoft CryptoAPI, over the audio channel. In the Windows system, the CSP for sound verification 321 exposes the Cryptographic System Program Interface (CryptoSPI) functions over the audio channel. It can be regarded as a series of CryptoSPI audio-based RPC calls. For example, the CSP for sound verification (321) exposes the following Cryptographic System Program Interface (CryptoSPI) functions:

|  |
| --- |
| CPAcquireContext |
| CPCreateHash |
| CPDecrypt |
| CPDeriveKey |
| CPDestroyHash |
| CPDestroyKey |
| CPEncrypt |
| CPExportKey |
| CPGenKey |
| CPGenRandom |
| CPGetHashParam |
| CPGetKeyParam |
| CPGetProvParam |
| CPGetUserKey |
| CPHashSessionKey |
| CPImportKey |
| CPReleaseContext |
| CPSetHashParam |
| CPSetKeyParam |
| CPSetProvParam |
| CPSignHash |
| CPVerifySignature |

The CSP for sound verification 321 operates in the same way as it would in a system employing traditional smart card readers except that corresponding interfaces are redirected so that the CSP 321 communicates with the mobile device 310 over the audio channel while it "thinks" that it is communicating to a standard smart card reader. As described above, communication over the audio channel is accomplished by utilizing the speaker and microphone on the client 320 and the speaker and microphone on the mobile device 310.

The client 320 is any type of applicable computing device. For example, the client 320 can be a workstation and the system can be Windows PC, Mac, Thin client, Zero client, Chrome book, etc. The client 320 further contains an application 330 that requires authentication before access is permitted. As described above, the application 330 may be an application requiring authentication before the user is permitted to log-on to the client 320. The application 330 may be a web-based application or a native application.

When the user attempts to access the application 330, the CSP for sound verification 321 requests the user to provide authentication. The user brings the mobile device 310 close to the client 320 (within audible range of the audio channel). For security considerations, the end user can be required to use the mobile device's 310 native security method, e.g. password, gesture password, fingerprint etc. to open/unlock the mobile SVA 311 at first. The mobile SVA 311 can also allow the user to select (e.g., through a menu in the mobile SVA 311 application graphical interface) which certificate the user wishes to use for authenticating on the client 320. Consequently, authentication is performed by an interchange of messages between the CSP 321 and the mobile SVA 311 according to the standard specifications, over the audio channel. For example, authentication is achieved by making the CryptoSPI remote call over the audio channel.

The example of FIG. 3A further illustrates an enterprise certificate authority ("enterprise CA") 380 containing a root certificate authority ("root CA"). The enterprise CA 380 is connected to the active directory 370 and issues and manages digital certificates in the system. For example, the enterprise CA 380 can store public keys in the system and make the public keys available to the client 320 when needed for decrypting signatures.

As illustrated in the example of FIG. 3A, in such embodiments the standard framework of smart card authentication can be implemented while redirecting the smart card interface to the audio channel, allowing the mobile device to be used in place of the smart card and smart card reader. An advantage of using such approaches that implement smart card interface redirection is that the application 330 can remain relatively unchanged.

Figure 3B:
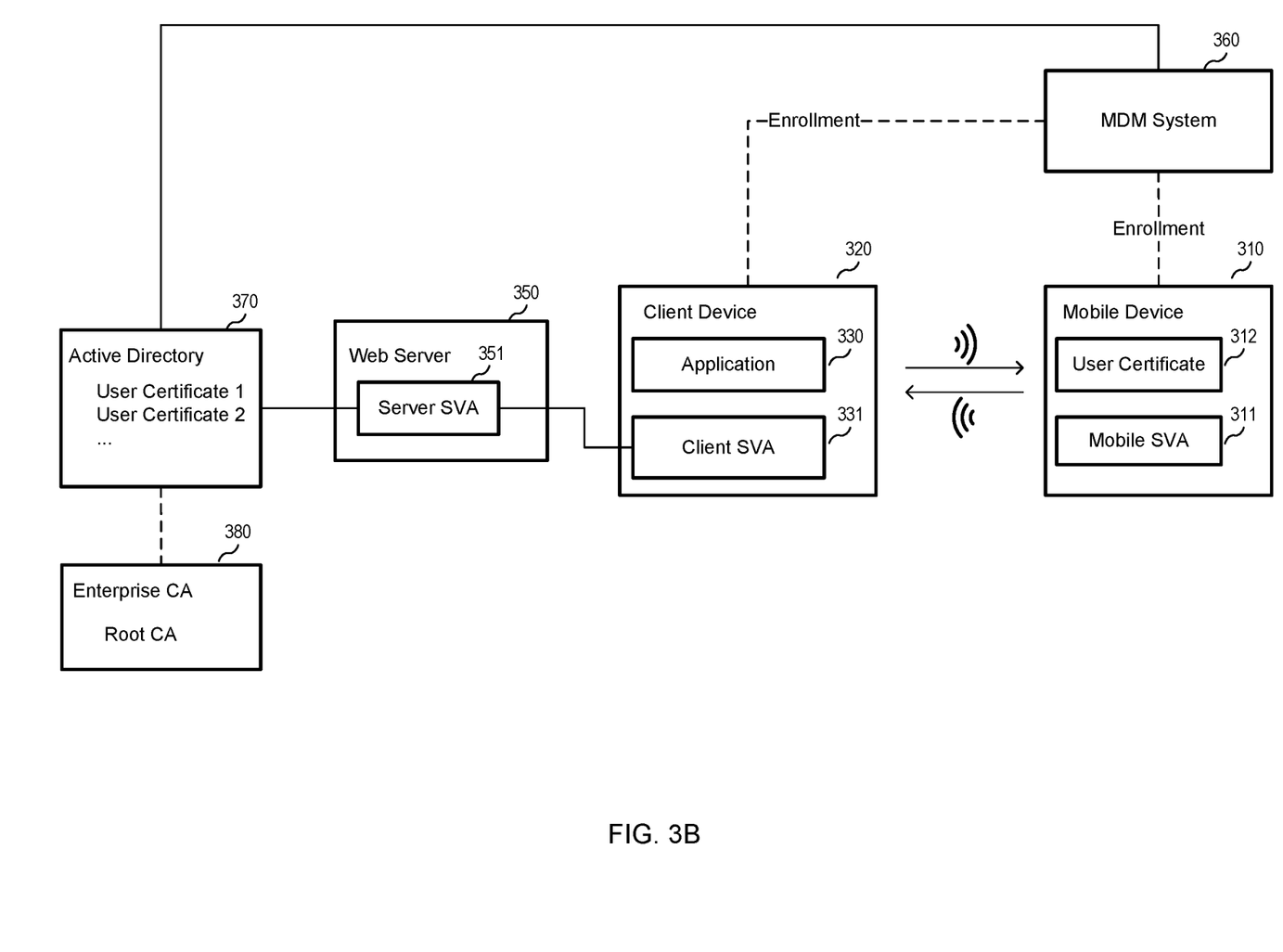
FIG. 3B illustrates an example architecture of a system for user authentication in an enterprise using mobile device over audio channel authentication, in accordance with various embodiments.

FIG. 3B illustrates an example architecture of a system for user authentication in an enterprise using mobile device over audio channel authentication, in accordance with various embodiments. The components of FIG. 3B that are identical to the components of FIG. 3A have analogous functions, except as indicated otherwise. As illustrated in the example of FIG. 3B, a client sound verification application ("client SVA") 331 executes on the client 320 for providing smart card authentication functions. The client SVA 331 can be part of the application 330 or it can be a separate application operating in communication with the application 330. In the example of FIG. 3B, the application 330 is a web application; however, the system can be likewise implemented with native applications using corresponding modifications.

The system further contains a web server 350 that executes a server sound verification application ("server SVA") 351. The server 350 communicates with the client device 320 and with the active directory 370 over one or a series of networks. The client SVA 331 and server SVA 351 are used by the application 330 to perform authentication over audio, such as to broadcast the audio authentication messages, handle the mobile device 310 authentication over the audio channel, etc. On the client 320 side, the client SVA 331 can be a java script library (or any language implementation that can be loaded by the web application 330) that is loaded by the web application 330 and runs in the web browser on the client 320 system. On the server 350 side, the server SVA 351 can be a node.js module (or any other language implementation, e.g. NET, PHP, J2EE etc, depending on the server technology) as part of a node.js application for handling the authentication request/response from the web application 330 on the client 320 side.

When the user attempts an access or makes a request on the application 330 that requires authentication, the application 330 requests the user to perform authentication. For example, the application 330 can produce a message on the GUI of the client 320 requesting the user to authenticate. The user then brings the mobile device 310 in proximity of the client 320 (e.g., within reach of the audio channel). For security considerations, the user may be required to use the mobile device's 310 native security method, e.g. password, gesture password, fingerprint, etc. to open/unlock the mobile SVA 311 before proceeding.

Once the mobile device 310 and the client 320 are connected over the audio channel, the mobile SVA 311 conveys the mobile device 310 ID to the client SVA 331. The client SVA 331 conveys the obtained mobile device 310 ID and the client 320 ID to the server SVA 351 to receive a UUID (Universally Unique Identifier) as a one-time token from the server SVA 351. Before the server SVA 351 provides the UUID, it checks if the mobile device 310 is still valid, i.e., that the mobile device 310 is still managed by the MDM system 360, as a security measure.

The server SVA 351 keeps this UUID in a history list for later cross checking. The history list holds the iteration information such as: {"workstation": "Client Machine1", "app": "https://jk.com", "uuid": "UUID1"}.

The client SVA 331 broadcasts an authentication message for verifying the mobile device 310/user via the audio channel to the mobile device 310. The broadcast authentication message can contain information identifying the client 320, which application is being accessed, and the one-time token. An inaudible frequency can be selected for security/management purposes.

The broadcasted authentication message from the client SVA 331 to the nearby mobile device 310 can contain, for example, the following: {"workstation": "Client Machine1", "app": "https://jk.com", "uuid": "UUID1"}. While the end user holds his/her mobile device 310 close to the client 320, the mobile SVA 311 in the mobile device 310 receives the above broadcasted message over the audio channel and parses the message to read the {"workstation": "Client Machine1", "app": "https://jk.com", "uuid": "UUID1"}.

The mobile SVA 311 then accesses the user certificate 312 and gets the user's name and private key. The mobile SVA 311 signs the response message using the private key and predefined signing algorithm, such as rsa-sha256, and broadcasts the response message to the client 320 over the audio channel. The response message from the mobile device 310 to the client SVA 331 can be, for example: {"mobile": "Sam phone", "workstation": "Client Machine1", "app": "https://jk.com", "InResponseTo": "UUID1", "Identity": "User1@jk.com," SignatureValue":" xBtZsvbmWqcXAT7GW+LafG+ fZwPmUQxMTB9ZupVR8LdDG6Q=="}. The table below shows the contents of the response message.

| Mobile Device | Workstation | Web application to login | Reply Message | Identity | SignatureValue |
|---|---|---|---|---|---|
| Sam phone | Client Machine1 | https://jk.com | UUID1 | user1@jk.com | xBtZsvbmWqcXAT7GW+LafG+ fZwPmUQxMTB9ZupVR8LdDG6Q== |

The client SVA 331 receives the response over the audio channel and parses it. The client SVA 331 communicates with the server SVA 351 on the web server 350 to retrieve the user's (e.g., user1@jk.com) public key and the UUID value in the history list. The server SVA 351 can obtain the public key from the enterprise CA 380. The server SVA 351 removes the iteration value {"workstation": "Client Machine1", "app": "https://jk.com", "uuid": "UUID1"} from the history list to make sure the UUID has one-time usage. The server SVA 351 then decrypts/verifies the signature value using the user's public key to confirm that the response message is sent from user's mobile device. The server SVA 351 also cross checks the InResponseTo value in the response message with the returned UUID value to prevent playback attacks. If all information is verified as correct, authentication is complete and the server SVA 351 communicates to the client SVA 331 to allow the user access.

Figure 4:
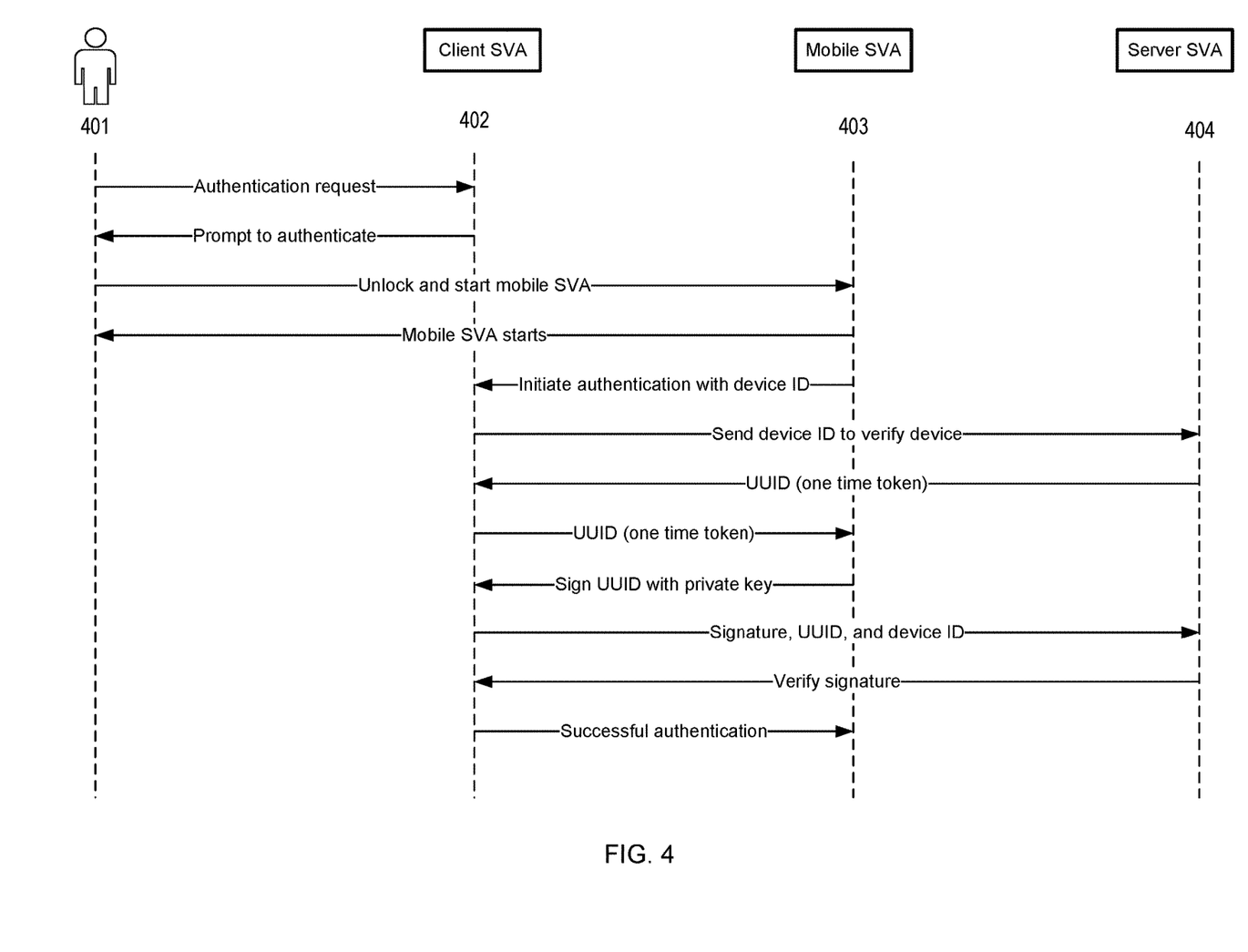
FIG. 4 illustrates an example of a process for mobile device over audio channel authentication, in accordance with various embodiments.

FIG. 4 illustrates an example of a process for mobile device over audio channel authentication, in accordance with various embodiments. For example, this process can be implemented in an enterprise setting as illustrated in FIG. 3B. As shown in this example, a user 401 initiates activity that generates an authentication request at the client sound verification application ("client SVA") 402 executing on a client computing device that the user is using. For example, the authentication request can be produced when the user requests to log in on the client device. The client device can be a workstation in an enterprise. In response to the request, the client SVA 402 prompts the user to produce authentication. For example, the client SVA 402 can display a message to the user 401 instructing the user to authenticate himself/ herself. In response to the prompt, the user 401 starts a mobile sound verification application ("mobile SVA") 403 on the user's mobile device. For added security, the user can also be prompted to unlock the mobile SVA 403 by putting in a password, fingerprint, or via another locking mechanism implemented on the mobile device.

Once started, the mobile SVA 403 initiates the authentication procedure with the client SVA 402 and sends the mobile device ID to the client SVA 402 over an audio channel established between the client device and the mobile device. The client SVA 402 receives the mobile device ID and sends the mobile device ID to the server SVA 404 in order to verify the mobile device and to receive a UUID as a one time token from the server. The server SVA 404 receives the mobile device ID and as a security measure verifies that the mobile device is still valid, e.g., the server SVA 404 can check that the mobile device is still managed by the MDM system. Once the mobile device ID is verified by the server SVA 404, the server SVA 404 sends a UUID to the client SVA 402 as a one time token. The client SVA 402 sends the UUID to the mobile SVA 403 in an authentication message for verifying the user. The mobile SVA 403 then signs the UUID with a private key that the mobile SVA 403 obtains from a user certificate stored on the mobile device and conveys the signed UUID to the client SVA 402 over the audio channel. The client SVA 402 receives the signed UUID and conveys the signature, the UUID, and the device ID to the server SVA 404. The server SVA 404 verifies the signature and, if verification is successful, notifies the client SVA 402 that the verification is successful. For example, the server SVA 404 can verify the signature by decrypting it using a public key corresponding to the user's certificate that the server SVA 404 obtains from a certificate authority. The client SVA 402 then determines that authentication is successful and allows the user access.

Figure 5:
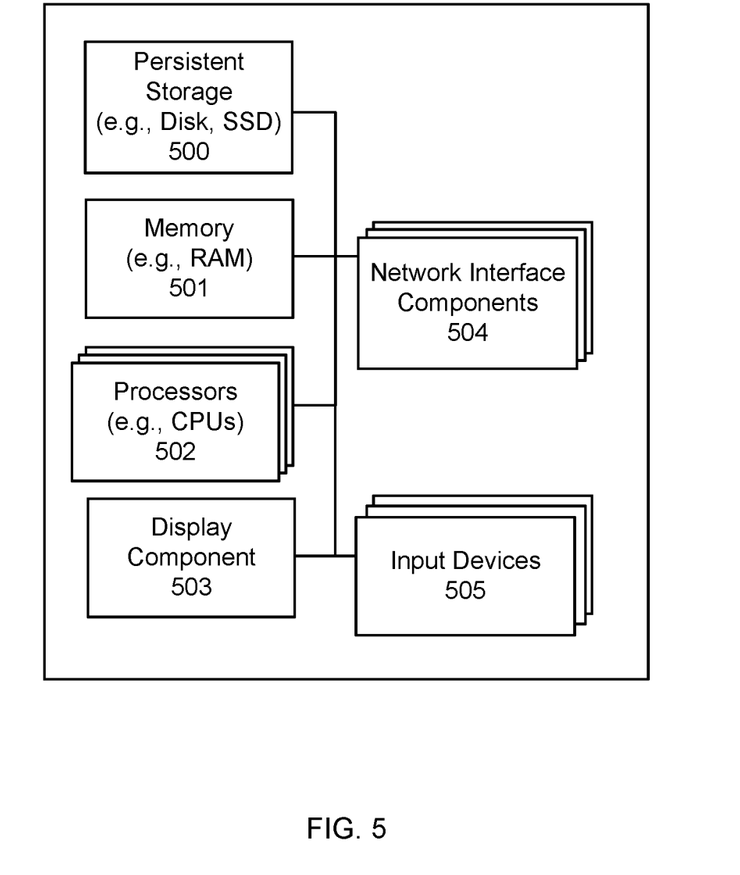
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for performing authentication on a computing device using a mobile device, comprising:
   receiving by an application executing on the computing device a request from a user, the request requiring authentication of the user before being allowed by the application;
   receiving, via a microphone of the computing device, an audio transmission from the user's mobile device, the audio transmission containing encoded data including information authenticating the user;
   decoding the audio transmission and extracting the encoded data including the information authenticating the user;
   verifying the extracted information authenticating the user; and
   in response to verifying the extracted information authenticating the user, allowing the request.

2. The method of claim 1, wherein the information authenticating the user comprises a unique signature computed on the mobile device that verifies the user.

3. The method of claim 1, further comprising:
   receiving, via a microphone of the mobile device, an authentication message for verifying the user that is sent from a speaker of the computing device, wherein the authentication message is generated by the computing device in response to the request from the user;
   on the mobile device, computing a signature based on the received authentication message using a secret key stored on the mobile device;
   conveying the signature to the computing device via an audio transmission from a speaker of the mobile device to the microphone of the computing device.

4. The method of claim 3, wherein the signature is computed on the mobile device by encrypting data contained in the authentication message using the secret key.

5. The method of claim 4, wherein verifying the information authenticating the user comprises decrypting the signature and verifying the contents of the decrypted signature.

6. The method of claim 1, wherein user authentication is performed based on public key infrastructure by exchanging messages between the computing device and the mobile device over an audio channel established between the mobile device and the computing device.

7. The method of claim 1, wherein the audio transmission is configured to be effective only when the mobile device is located within a predetermined maximum distance from the computing device.

8. The method of claim 3, further comprising:
   conveying the information authenticating the user from the computing device to a server for performing user authentication;
   verifying the information authenticating the user on the server; and
   sending a notification from the server to the computing device indicating that the user has been authenticated.

9. The method of claim 8, wherein the verifying the information authenticating the user comprises decrypting the signature using a public key corresponding to the user.

10. A computing device, comprising:
    at least one processor; and
    memory including instructions that, when executed by the at least one processor, cause the computing device to perform the steps of:
       receiving by an application executing on the computing device a request from a user, the request requiring authentication of the user before being allowed by the application;
       receiving, via a microphone of the computing device, an audio transmission from the user's mobile device, the audio transmission containing encoded data including information authenticating the user;
       decoding the audio transmission and extracting the encoded data including the information authenticating the user;
       verifying the extracted information authenticating the user; and
       in response to verifying the extracted information authenticating the user, allowing the request.

11. The computing device of claim 10, wherein the information authenticating the user comprises a unique signature computed on the mobile device that verifies the user.

12. The computing device of claim 10, wherein the memory further includes instructions that when executed by the at least one processor, cause the computing device to perform the steps of:
    receiving, via a microphone of the mobile device, an authentication message for verifying the user that is sent from a speaker of the computing device, wherein the authentication message is generated by the computing device in response to the request from the user;
    on the mobile device, computing a signature based on the received authentication message using a secret key stored on the mobile device;
    conveying the signature to the computing device via an audio transmission from a speaker of the mobile device to the microphone of the computing device.

13. The computing device of claim 12, wherein the signature is computed on the mobile device by encrypting data contained in the authentication message using the secret key.

14. The computing device of claim 13, wherein verifying the information authenticating the user comprises decrypting the signature and verifying the contents of the decrypted signature.

15. The computing device of claim 12, wherein the memory further includes instructions that when executed by the at least one processor, cause the computing device to perform the steps of:
    conveying the information authenticating the user from the computing device to a server for performing user authentication;
    verifying the information authenticating the user on the server; and
    sending a notification from the server to the computing device indicating that the user has been authenticated.

16. A non-transitory computer readable storage medium comprising one or more sequences of instructions, the instructions when executed by one or more processors causing the one or more processors to execute the operations of:

receiving by an application executing on the computing device a request from a user, the request requiring authentication of the user before being allowed by the application;

receiving, via a microphone of the computing device, an audio transmission from the user's mobile device, the audio transmission containing encoded data including information authenticating the user;

decoding the audio transmission and extracting the encoded data including the information authenticating the user;

verifying the extracted information authenticating the user; and in response to verifying the extracted information authenticating the user, allowing the request.

17. The non-transitory computer readable storage medium of claim 16, wherein the information authenticating the user comprises a unique signature computed on the mobile device that verifies the user.

18. The non-transitory computer readable storage medium of claim 16, further comprising instructions that when executed by the one or more processors cause the one or more processors to execute the operations of:

receiving, via a microphone of the mobile device, an authentication message for verifying the user that is sent from a speaker of the computing device, wherein the authentication message is generated by the computing device in response to the request from the user;

on the mobile device, computing a signature based on the received authentication message using a secret key stored on the mobile device;

conveying the signature to the computing device via an audio transmission from a speaker of the mobile device to the microphone of the computing device.

19. The non-transitory computer readable storage medium of claim 18, wherein the signature is computed on the mobile device by encrypting data contained in the authentication message using the secret key.

20. The non-transitory computer readable storage medium of claim 18, further comprising instructions that when executed by the one or more processors cause the one or more processors to execute the operations of:

conveying the information authenticating the user from the computing device to a server for performing user authentication;

verifying the information authenticating the user on the server; and sending a notification from the server to the computing device indicating that the user has been authenticated.

* * * * *